United States Patent
De Pelsemaeker et al.

(10) Patent No.: US 9,556,823 B2
(45) Date of Patent: Jan. 31, 2017

(54) DEVICE FOR THE INJECTION OF RECIRCULATED EXHAUST GASES, DISTRIBUTION BOX AND SUPPLY MODULE COMPRISING SAID DEVICE

(75) Inventors: Georges De Pelsemaeker, Poigny-la-Foret (FR); Jean-Pierre Galland, Les Essarts-le-Roi (FR); Laurent Odillard, Le Luart (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 263 days.

(21) Appl. No.: 14/008,712

(22) PCT Filed: Feb. 13, 2012

(86) PCT No.: PCT/EP2012/052387
§ 371 (c)(1),
(2), (4) Date: Mar. 27, 2014

(87) PCT Pub. No.: WO2012/130513
PCT Pub. Date: Oct. 4, 2012

(65) Prior Publication Data
US 2014/0224213 A1 Aug. 14, 2014

(30) Foreign Application Priority Data
Mar. 31, 2011 (FR) ...................... 11 52697

(51) Int. Cl.
*F02M 69/04* (2006.01)
*F02M 25/07* (2006.01)
(Continued)

(52) U.S. Cl.
CPC .......... *F02M 25/07* (2013.01); *F02B 29/0462* (2013.01); *F02M 26/00* (2016.02);
(Continued)

(58) Field of Classification Search
CPC .................. F02M 69/044; F02M 59/00; F02M 2700/1317; F02D 1/00; F02D 9/00
(Continued)

(56) References Cited

U.S. PATENT DOCUMENTS 4,191,247 A * 3/1980 Versteeg ................. F28D 7/026
165/145
5,957,116 A * 9/1999 Haegele et al. ......... 123/568.12
(Continued)

FOREIGN PATENT DOCUMENTS

DE  3916466 A1  11/1990
DE  19837623 A1  3/1999
(Continued)

OTHER PUBLICATIONS

English language abstract and machine translation for DE 3916466 extracted from espacenet.com database on Apr. 17, 2014, 15 pages.
(Continued)

*Primary Examiner* — Lindsay Low
*Assistant Examiner* — Charles Brauch
(74) *Attorney, Agent, or Firm* — Howard & Howard Attorneys PLLC

(57) ABSTRACT

The invention relates to a device for the injection of recirculated exhaust gases from a vehicle engine, in particular a diesel engine, the injection device comprising a plurality of injection ports (26.1, 26.2, 26.3, 26.4), provided in a portion of the material of the injection device, each injection port (26.1, 26.2, 26.3, 26.4) having a cross section and a height extending through the thickness of the material. According to the invention, the cross sections and/or the heights of at least two of the injection ports (26.1, 26.2, 26.3, 26.4) are different.

13 Claims, 5 Drawing Sheets

(51) Int. Cl.
*F02M 35/104* (2006.01)
*F02B 29/04* (2006.01)
*F02M 59/00* (2006.01)
*F02D 1/00* (2006.01)

(52) U.S. Cl.
CPC ........ *F02M 26/19* (2016.02); *F02M 35/1045* (2013.01); *F02D 1/00* (2013.01); *F02M 26/09* (2016.02); *F02M 26/20* (2016.02); *F02M 59/00* (2013.01); *F02M 69/044* (2013.01); *F02M 2700/1317* (2013.01); *Y02T 10/146* (2013.01)

(58) Field of Classification Search
USPC ........................................................ 123/445
See application file for complete search history.

(56) References Cited

U.S. PATENT DOCUMENTS

| | | | |
|---|---|---|---|
| 2001/0025632 A1 | 10/2001 | Pietrowski et al. | |
| 2009/0235657 A1* | 9/2009 | Rampen .................. | F01P 7/044 60/456 |
| 2010/0077996 A1 | 4/2010 | Pantow et al. | |
| 2013/0042840 A1 | 2/2013 | Braic et al. | |

FOREIGN PATENT DOCUMENTS

| | | |
|---|---|---|
| EP | 1122421 A2 | 8/2001 |
| EP | 1870591 A2 | 12/2007 |
| EP | 2169208 A1 | 3/2010 |
| FR | 2879262 A1 | 6/2006 |
| WO | WO 2008116568 A1 | 10/2008 |
| WO | WO 2011104118 A1 | 9/2011 |

OTHER PUBLICATIONS

English language abstract for DE 19837623 extracted from espacenet.com database on Apr. 17, 2014, 19 pages.
English language abstract for EP 1122421 extracted from espacenet.com database on Apr. 17, 2014, 11 pages.
English language abstract and machine translation for EP 1870591 extracted from espacenet.com database on Apr. 17, 2014, 39 pages.
English language abstract and machine translation for EP 2169208 extracted from espacenet.com database on Apr. 17, 2014, 76 pages.
English language abstract and machine translation for FR 2879262 extracted from espacenet.com database on Apr. 17, 2014, 18 pages.
English language abstract for WO 2008/116568 extracted from espacenet.com database on Apr. 17, 2014, 31 pages.
English language abstract for WO 2011/104118 extracted from espacenet.com database on Apr. 17, 2014, 25 pages.
International Search Report for PCT/EP2012/052387, dated Mar. 15, 2012, 7 pages.

* cited by examiner

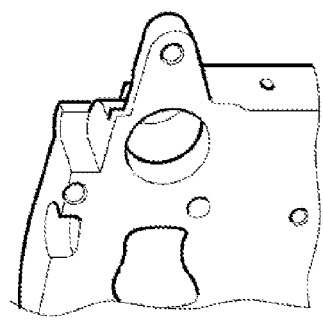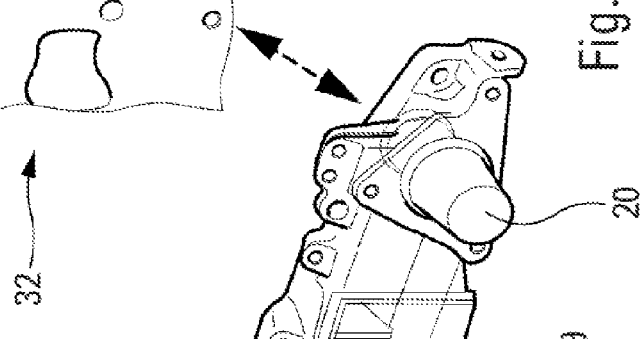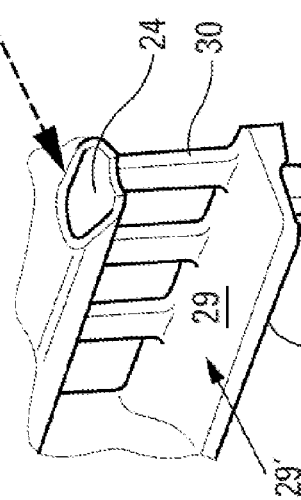

DEVICE FOR THE INJECTION OF RECIRCULATED EXHAUST GASES, DISTRIBUTION BOX AND SUPPLY MODULE COMPRISING SAID DEVICE

RELATED APPLICATIONS

This application is the National Stage of International Patent Application No. PCT/EP2012/052387, filed on Feb. 13, 2012, which claims priority to and all the advantages of French Patent Application No. FR 11/52697, filed on Mar. 31, 2011, the content of which is incorporated herein by reference.

The invention relates to a device for the injection of recirculated exhaust gases from a vehicle engine, a gas distribution box in the said engine and a gas supply module for the said engine, comprising the said device.

An inlet gas supply module for a vehicle engine permits the supply of a mixture, referred to as inlet gas, comprising air, for operating the engine.

Such an inlet gas supply module comprises a heat exchanger permitting the air to be cooled and a distribution box permitting the cooled air to be collected and to be distributed towards the cylinders of the engine.

BACKGROUND

Already familiar are inlet gas supply modules comprising in addition a valve which permits the injection of a proportion of the exhaust gases emitted by the engine, referred to as recirculated exhaust gases, into the distribution box.

Such a distribution box thus permits a mixture of cooled air arriving from the heat exchanger and of recirculated exhaust gases arriving from the valve to be distributed towards the cylinders of the engine.

For this purpose, the distribution box comprises a cavity defining a space inside which the cooled air arriving from the heat exchanger and the recirculated exhaust gases arriving from the valve are mixed.

In order to inject the recirculated exhaust gases into this space, a distribution box of this kind includes an injection channel of substantially cylindrical form and pierced by a plurality of injection ports, or injectors.

Already familiar is a distribution box, of which the injection ports all have the same diameter and are arranged linearly along the injection channel opposite the cylinders of the engine, the admission of the gas into the injection channel taking place, via the valve, at one of the extremities of the injection channel.

It has been found that, in such a distribution box, as the recirculated exhaust gases advance inside the injection channel, the static pressure and thus the injection flow of the recirculated exhaust gases diminishes for each successive cylinder, with the result that the injection flows and thus the recycling rates and the temperatures of the gases are uneven between the cylinders. In addition, this may cause the obstruction of some of the injection ports by particles contained in the recirculated exhaust gases.

SUMMARY OF THE INVENTION

The object of the invention is to address at least a part of these disadvantages and relates to a device for the injection of recirculated exhaust gases of a vehicle engine, in particular a diesel engine, the said injection device comprising a plurality of injection ports provided in a portion of the material of the said injection device, each injection port having a cross section and a height in the said thickness of the material, the injection device being noteworthy in the sense that the cross sections and/or the heights of at least two of the injection ports are different.

The geometry of the ports can be adapted in this way in order to have a substantially constant static pressure at each one.

According to one characterizing feature of the invention, the injection device is an injection channel and the injection ports are configured, along the injection channel, in such a way that their cross sections and/or the respective heights induce an injection flow for the recirculated exhaust gases that is substantially equal for each injection port. This permits the rates of recycling and the temperatures of the recirculated exhaust gases to be evened out between the cylinders of the engine. Such an injection flow also permits the obstruction of the ports to be avoided.

Preferably, the height of each injection port is constant and the cross sections of at least two of the injection ports are different.

According to another characterizing feature of the invention, the cross section of each injection port is constant and the heights of at least two of the injection ports are different.

According to one aspect of the invention, the device is configured in order for the recirculated exhaust gases to circulate inside the said channel from at least one inlet, the cross section of the said ports decreasing from the said inlet and/or the height of the said ports increasing from the said inlet.

According to a characterizing feature of the invention, the ratio of the largest cross-sectional area to the smallest cross-sectional area of the injection ports lies in the range between 1.4 and 2.25.

Preferably, the injection ports are of circular cross section and their respective diameters lie in the range between 8 and 15 mm.

Advantageously, the ratio of the diameters of the injection ports to the diameter of the injection channel lies in the range between 0.1 and 0.4.

By preference, the number of injection ports is intended to be equal to the number of cylinders of the engine or to a multiple of the number of cylinders of the engine. Such a number of ports permits the recirculated exhaust gases to be injected in a substantially equal manner between all the cylinders of the engine.

The invention also relates to a gas distribution box of a vehicle engine, in particular a diesel engine, the said distribution box comprising an injection device of the kind defined above, and a space capable of allowing the mixture of a flow of air arriving, in particular, from a heat exchanger, and the recirculated exhaust gases injected by the said injection device into the said space.

The invention also relates to an inlet gas supply module of a vehicle engine, in particular a diesel engine, the said module comprising a heat exchanger for the said inlet gases and an injection device of the kinds defined above, the module being configured to permit the injection of the recirculated exhaust gases into the said inlet gases downstream of the exchanger according to the direction of flow of the inlet gases inside the module.

BRIEF DESCRIPTION OF THE DRAWINGS

Other characterizing features and advantages of the invention will be appreciated from the following description made in respect to the accompanying figures, which are provided by way of non-exhaustive examples. Identical references are given to similar objects.

FIG. 4a represents in perspective a distribution box of an inlet gas supply module according to the invention.

FIG. 4b is a partial view, in perspective, of a distribution box of an inlet gas supply module, according to the invention, illustrated in cross-section in such a way as to make visible the interior of its injection channel.

FIG. 4c is a partial view of a cylinder head of a vehicle engine, on which the box in FIG. 4a is intended to be mounted.

DETAILED DESCRIPTION

Different elements of an inlet gas supply module of a vehicle engine are represented in FIGS. 1 to 5.

Figure 1:
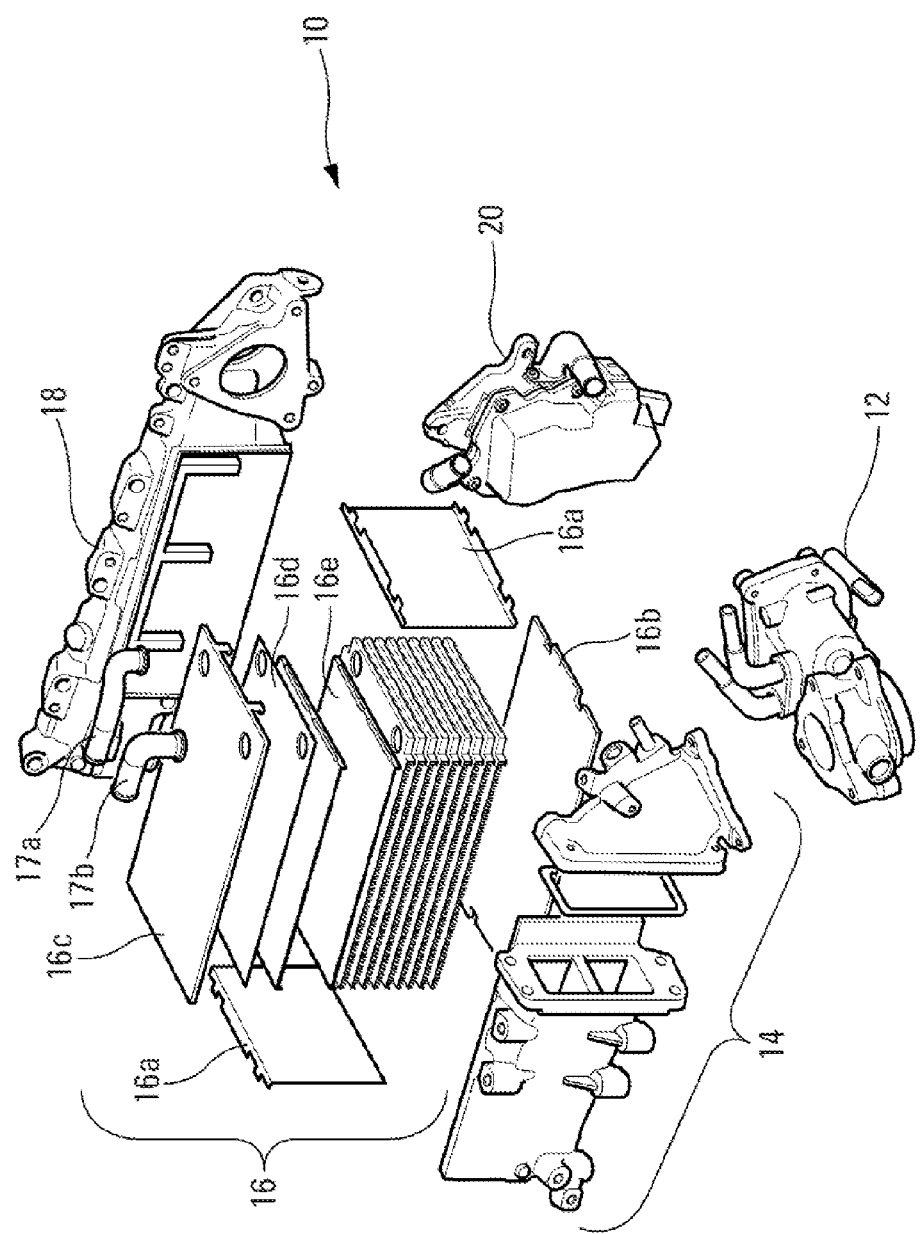
FIG. 1 is an exploded view, in perspective, of an inlet gas supply module for a vehicle engine, according to the invention.

The inlet gas supply module 10 of a vehicle engine illustrated in FIG. 1 comprises a collection box 14 supplying a heat exchanger 16 with a fluid, for example with air from a boost circuit of the engine. The said module could also comprise a valve 12 used to control the flow of fluid.

The heat exchanger 16 comprises, for example, lateral walls 16a, a lower wall 16b and an upper wall 16c, between which plates 16d and internal spacers 16e are positioned one on top of the other. The upper wall 16c comprises inlet/outlet tubes 17a, 17b for a liquid for cooling the fluid. The plates 16d are assembled in pairs in order to form, between two plates of one and the same pair, first channels for the circulation of the cooling fluid and, between two plates situated opposite two neighboring pairs, channels for the circulation of the fluid equipped with the said spacers 16e. The fluid thus circulates across the valve 12, then the collection box 14 and finally across the internal spacers 16e.

The inlet gas supply module 10 comprises a distribution box 18 permitting the fluid, which has been cooled by the heat exchanger 16, to be distributed or guided towards the cylinders of the engine of the vehicle.

The illustrated inlet gas supply module 10 also comprises a valve 20 permitting the introduction of a proportion of the exhaust gases emitted by the engine, referred to as recirculated exhaust gases, into the distribution box 18. The said valve 20 is referred to as an EGR valve.

Figure 2:
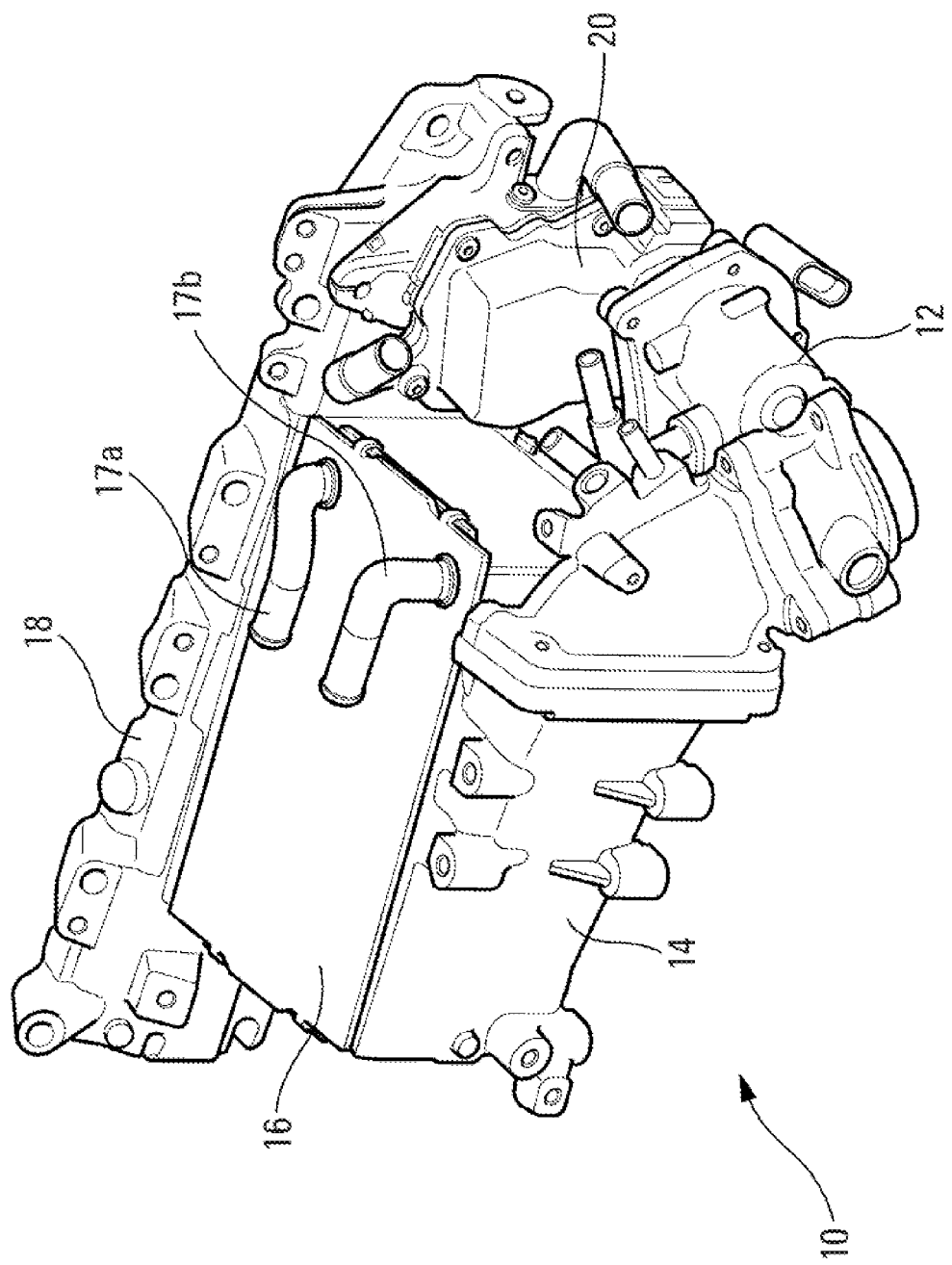
FIG. 2 illustrates, in perspective, the supply module in FIG. 1 in an assembled state.

FIG. 2 illustrates the inlet gas supply module 10 in FIG. 1 in an assembled state. The valve 12 used to control the flow of fluid supplying the module is thus mounted on the fluid collection box 14. The collection box 14 is mounted on one of the two faces of the heat exchanger 16 without a wall in order to permit the passage of the fluid towards the exchanger. The distribution box 18 is mounted on the other face of the heat exchanger 16 without a wall in order to collect the fluid cooled by the heat exchanger 16, to mix it with the recirculated exhaust gases and to distribute the resulting mixture towards the cylinders of the engine. The EGR valve 20 is mounted on the distribution box 18.

Figure 3:
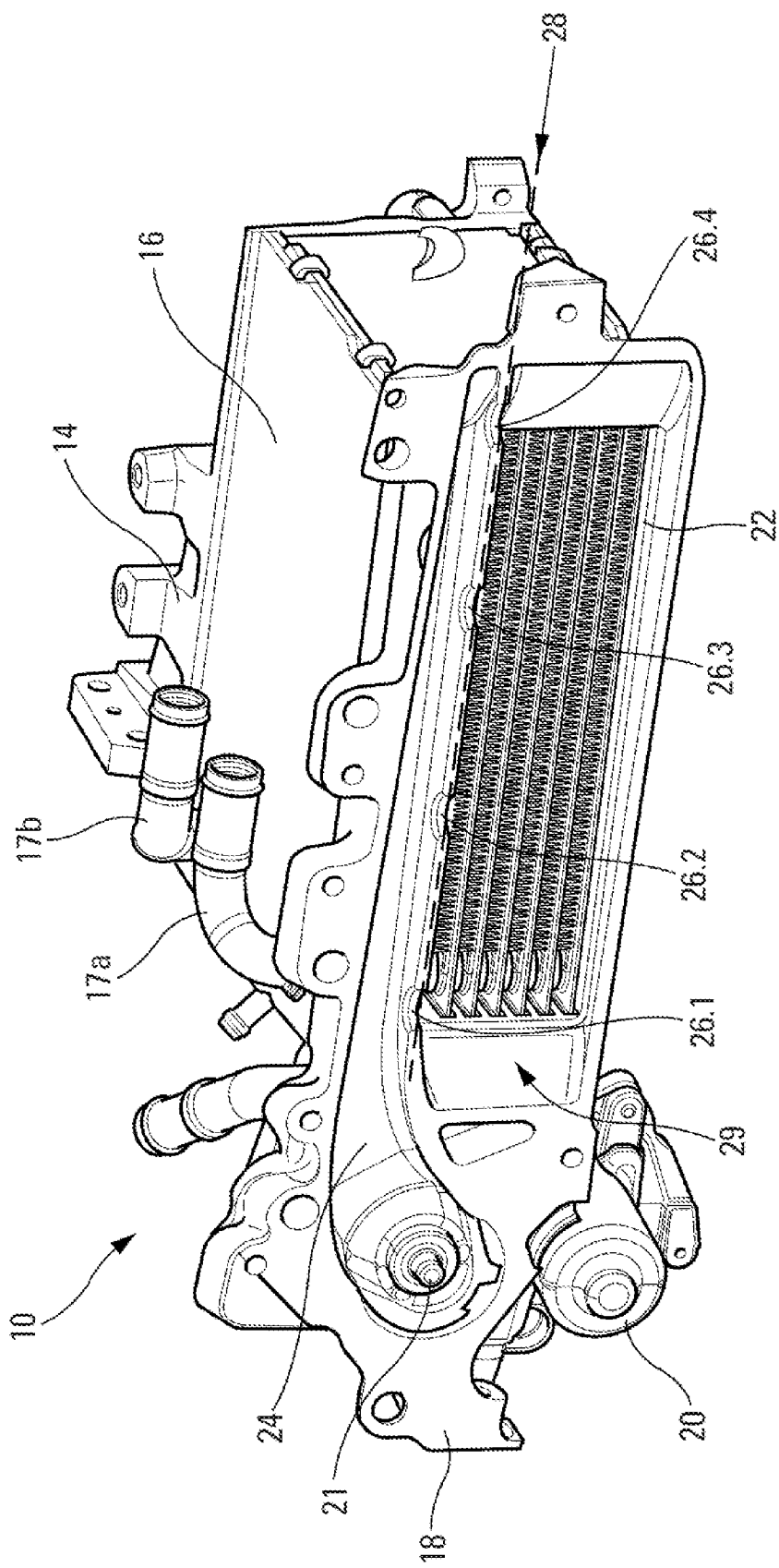
FIG. 3 is a view, in perspective, of a distribution box of an inlet gas supply module, according to the invention, illustrated in cross-section.

As illustrated in FIG. 3, the EGR valve 20 permits the passage of the recirculated exhaust gases via an inlet port 21 of an injection device 24 of the distribution box 18. Such an injection device 24 according to the invention comprises a plurality of injection ports, or injectors, 26.1, 26.2, 26.3, 26.4. The illustrated device exhibits the form of a channel. However, any equivalent form could be considered to be acceptable by a person skilled in the art in order to realize the present invention.

Preferably, although without implied limitation, the injection ports 26.1, 26.2, 26.3, 26.4 are arranged linearly along an axis 28 passing through them at their respective centers. They are arranged in such a way as to be present opposite the inlet gas supply ports of the engine. As a variant, each port may be duplicated.

In the illustration in FIG. 3, the injection channel 24 is of elongated form and is blocked at its extremity opposite the inlet for recirculated exhaust gases via the inlet port 21.

The distribution box 18 comprises a cavity defining, together with the orifice 22 at the junction with the heat exchanger 16, a space 29, inside which the cooled air arriving from the heat exchanger 16 and the recirculated exhaust gases arriving via the injection channel 24 of the distribution box 18 of the EGR valve 20 are mixed. The channel 24 is, in particular, made from the material of a housing of the box 18, defining the said space 29.

FIG. 4a illustrates the space 29 defined inside the distribution box 18 by the orifice 22 at the junction with the heat exchanger 16. The arrow 29' indicates the direction of flow of cooled fluid exiting from the heat exchanger 16 via the orifice 22 and entering into the space 29, as delimited by the orifice 22 and the cavity provided in the distribution box 18. For the sake of clarity, the EGR valve 20 is represented only partially in this FIG. 4a.

The injection channel 24, illustrated in FIG. 4b, of the distribution box 18 permits the injection of the recirculated exhaust gases arriving from the EGR valve 20 into the space 29 via the injection ports 26.1, 26.2, 26.3, 26.4, discharging substantially perpendicularly to the flow of cooled fluid arriving from the heat exchanger 16.

The mixture between the cooled fluid arriving from the heat exchanger 16 and the injected recirculated exhaust gases, produced inside the space 29, is subsequently distributed or guided by distribution box 18 guiding means 30 towards the inlet gas supply ports of the cylinders of the engine via its cylinder head 32.

As illustrated in FIG. 4c, the distribution box 18 and the cylinder head 32 of the engine are intended to be mounted one on top of the other.

Figure 5:
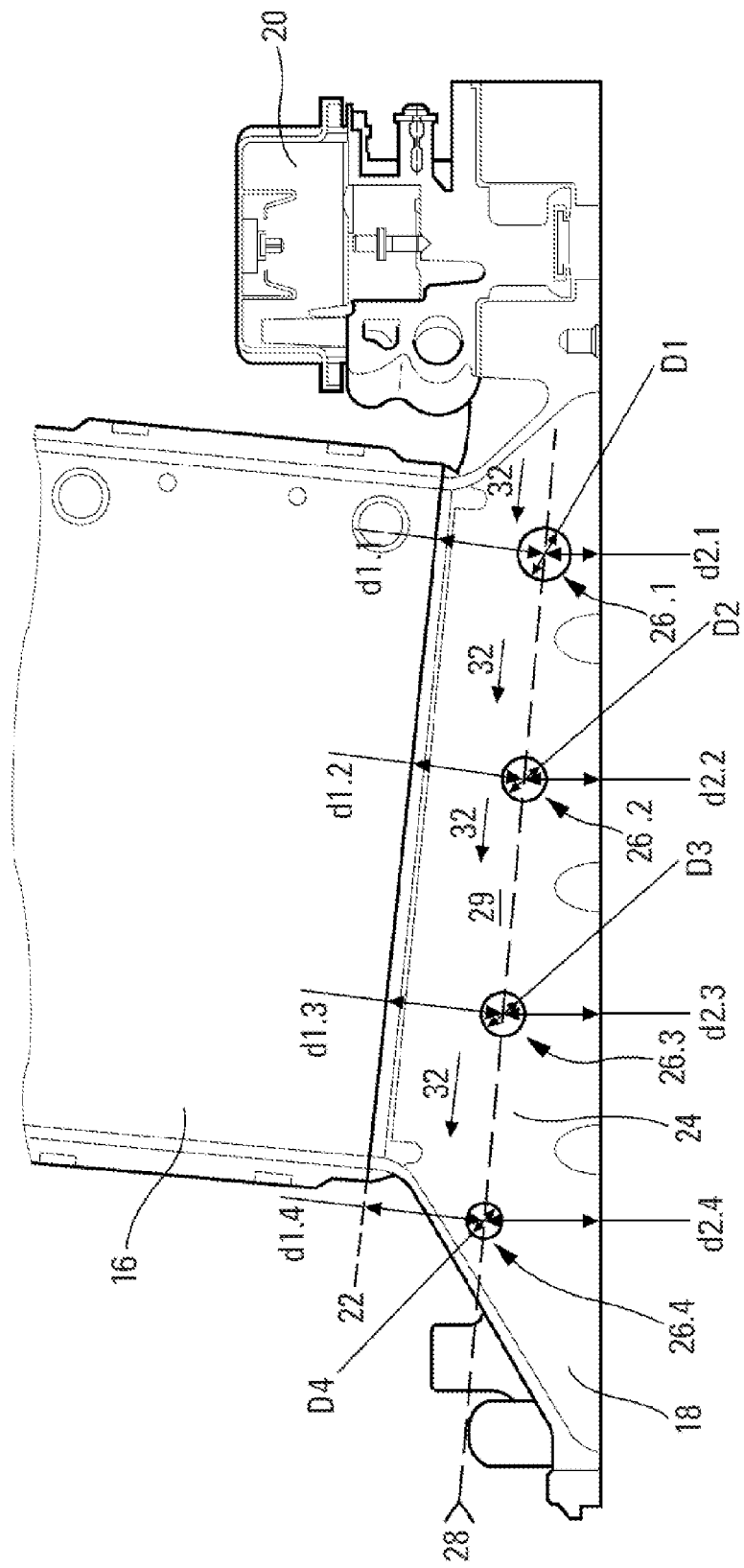
FIG. 5 is a partial view from below of an injection channel of a distribution box according to the invention, illustrated in cross-section in order to make visible the said channel.

FIG. 5 illustrates an injection channel 24, here comprising four ports 26.1, 26.2, 26.3 and 26.4 arranged linearly along an axis 28 passing through the center of each port. They can be more or less numerous. In particular, as already mentioned, they can be grouped in pairs, each pair being arranged in such a way as to be present opposite the inlet gas supply ports provided in the cylinder head of the engine.

The recirculated exhaust gases arriving from the valve 20 via the inlet port 21 circulate inside the injection channel 24 substantially in the sense of the arrows 32 in the direction of the ports 26.1, 26.2, 26.3 and 26.4.

According to the invention, the geometrical characterizing features of the ports are varied in order to adapt to the static pressure at the location of the ports.

In an embodiment of the distribution box 18 according to the invention, having a constant material thickness of the distribution box 18 between the injection channel 24 and the space 29 (i.e. having a constant port height), the surface and, by equivalence, the diameter D1, D2, D3, D4 of each port 26.1, 26.2, 26.3, 26.4 respectively, is configured in such a way that the static pressure of the recirculated exhaust gases, and thus the flow of the recirculated exhaust gases, remains substantially constant from one port to the other.

In another embodiment of the distribution box 18 according to the invention, the diameters D1, D2, D3, D4 may be constant, and only the thickness of the material of the distribution box 18 between the injection channel 24 and the space 29, that is to say the height of each port, may vary in order to keep the static pressure of the recirculated exhaust gases substantially constant and thus the flow of the recirculated exhaust gases substantially constant.

In another embodiment of the distribution box 18 according to the invention, both the thickness of the material of the distribution box 18 between the injection channel 24 and the space 29, that is to say the height of each port, and the diameters D1, D2, D3, D4 may vary from one port to the other by being configured in such a way that the static pressure of the recirculated exhaust gases is substantially constant, and thus that the flow of the recirculated exhaust gases is substantially constant. In other words, both the diameters and the heights of the ports may be different from one port to another.

It should be noted that the illustrated injection ports are of circular form, but that they could just as well be rectangular or of any other form, such as a slot, for example. Furthermore, in the case of the grouping of ports in pairs, as mentioned above, the ports of one and the same pair could be identical, only changing the geometrical characterizing features of the ports of different pairs.

Thus, in the distribution box 18 according to the invention, the height (thickness of the material) and the surface, of each port as well as, optionally, the spacing between two successive ports, are dimensioned in order to ensure that the injection flow of the recirculated exhaust gases inside the space 29 thus remains substantially constant.

The diameters D1, D2, D3, D4 respectively of the ports 26.1, 26.2, 26.3, 26.4 may thus lie in the range between 8 and 20 mm. In particular, they decrease from the inlet 21 of the channel 24. As far as the injection channel is concerned, it exhibits a cross section lying in the range between 20 and 28 mm, for example.

The ratio of the surface of the largest injection port to the surface of the smallest injection port lies in the range between 1.4 and 2.25, for example. And the ratio of their diameter in relation to the diameter of the distribution pipe lies in the range between 0.1 and 0.4, for example.

The distance d1.1, d1.2, d1.3, d1.4 represents respectively the distance between the center of the ports 26.1, 26.2, 26.3, 26.4 and the orifice. In other words, d1.1, d1.2, d1.3, d1.4 is the distance which separates the plane comprising the orifice 22 and the plane comprising the axis 28 for each port 26.1, 26.2, 26.3, 26.4. This distance may lie in the range between 32 and 36 mm, for example. It increases, for example, from one port to the other from the inlet 21 of the channel 24.

The distance d2.1, d2.2, d2.3, d2.4 represents the distance between the center of the ports 26.1, 26.2, 26.3, 26.4 and the cylinder head 32. This distance may lie in the range between 15 and 33 mm, for example. It increases, for example, from one port to the other from the inlet 21 of the channel 24.

It is possible in this way to reduce substantially the risks of explosion of the heat exchanger 16 induced by the high pressure of the recirculated exhaust gases arriving from the valve 20 and to optimize the mixture between the cooled fluid arriving from the heat exchanger 16 and the recirculated exhaust gases injected into the space 29 via the ports 26.1, 26.2, 26.3, 26.4.

As illustrated, the axis 28 passing through the center of each port 26.1, 26.2, 26.3, 26.4 forms, for example, a bisector of the angle formed by the planes of the orifice 22 on the exchanger and of the orifice 32 on the cylinder head.

Thus, the distances d1.1+d2.1, d1.2+d2.2, d1.3+d2.3, d1.4+d2.4 between the orifice 22 and the cylinder head 32 may lie in the range between, for example, 47 and 69 mm, thereby permitting the returns of flame from the cylinders towards the heat exchanger 16 to be avoided. These increase from one port to the other from the inlet 21 of the channel 24.

The invention claimed is:

1. An inlet gas supply module comprising: a heat exchanger, said heat exchanger including lateral walls, a lower wall and an upper wall between which plates and internal spacers are positioned one on top of the other; a collection box mounted on one longitudinal face of the heat exchanger to supply the heat exchanger with fluid from a vehicle engine; a distribution box mounted on an opposed longitudinal face of the heat exchanger to distribute the fluid which has been cooled by the heat exchanger to the engine to mix with the cooled fluid from the heat exchanger; a valve mounted on the distribution box to permit introduction of a proportion of recirculated exhaust gasses emitted by the vehicle engine into the distribution box, and an injection device disposed in the distribution box and fluidly communicating with the valve to inject the recirculated exhaust gases of the vehicle engine into the inlet gases downstream of the heat exchanger according to a direction of flow of the inlet gases inside the module, the injection device comprising a plurality of injection ports provided in a portion of a material of the injection device, each injection port having a cross section and a height in a thickness of the material, wherein the cross sections and/or the heights of at least two of the injection ports of the injection device are different, in which the relationship between a largest surface and a smallest surface of the cross sections of the injection ports lies in the range between 1.4 and 2.25.

2. The inlet gas supply module according to claim 1, wherein the injection device comprises an injection channel and the injection ports being configured along the injection channel, wherein the cross sections and/or respective heights of the injection ports induce an injection flow of the recirculated exhaust gases that is substantially equal for each injection port.

3. The inlet gas supply module according to claim 1, in which the height of each injection port is constant and the cross sections of at least two of the injection ports-are different.

4. The inlet gas supply module according to claim 1, in which the cross section of each injection port is constant and the heights of at least two of the injection ports are different.

5. The inlet gas supply module according to claim 2, the injection device capable of allowing the recirculated exhaust gases to circulate inside the injection channel from at least one inlet, inside which device the cross section of the ports decreases from the inlet and/or the height of the ports increases from the inlet.

6. The inlet gas supply module according claim 1, in which the injection ports are of circular cross section and their respective diameters lie in the range between 8 and 15 mm.

7. The inlet gas supply module according to claim 6, in which the relationship between the diameters of the injection ports and the diameter of the injection channel lies in the range between 0.1 and 0.4.

8. The inlet gas supply module according to claim 6, in which a number of injection ports is equal to a number of cylinders of an engine or to a multiple of the number of cylinders of the engine.

9. The inlet gas supply module according to claim 2, in which the height of each injection port is constant and the cross sections of at least two of the injection ports are different.

10. The inlet gas supply module according to claim 2, in which the cross section of each injection port is constant and the heights of at least two of the injection ports are different.

11. The inlet gas supply module according to claim 2, the device capable of allowing the recirculated exhaust gases to circulate inside the injection channel from at least one inlet, inside which device the cross section of the ports decreases from the inlet and/or the height of the ports increases from the inlet.

12. The inlet gas supply module according to claim 3, the device capable of allowing the recirculated exhaust gases to circulate inside the injection channel from at least one inlet, inside which device the cross section of the ports decreases from the inlet and/or the height of the ports increases from the inlet.

13. The inlet gas supply module according to claim 4, the device capable of allowing the recirculated exhaust gases to circulate inside the injection channel from at least one inlet, inside which device the cross section of the ports decreases from the inlet and/or the height of the ports increases from the inlet.

* * * * *